US011599683B2

(12) United States Patent
Hinkle et al.

(10) Patent No.: US 11,599,683 B2
(45) Date of Patent: Mar. 7, 2023

(54) ENFORCING AUTHORIZATION POLICIES FOR COMPUTING DEVICES

(71) Applicant: MicroStrategy Incorporated, Vienna, VA (US)

(72) Inventors: Aaron P. Hinkle, Centreville, VA (US); Jason P Torrey, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 17/096,144

(22) Filed: Nov. 12, 2020

(65) Prior Publication Data
US 2021/0150076 A1    May 20, 2021

Related U.S. Application Data

(60) Provisional application No. 62/936,934, filed on Nov. 18, 2019.

(51) Int. Cl.
*G06F 21/84* (2013.01)
*G06F 21/31* (2013.01)
*G06F 21/62* (2013.01)
*G06F 21/60* (2013.01)

(52) U.S. Cl.
CPC .............. *G06F 21/84* (2013.01); *G06F 21/31* (2013.01); *G06F 21/604* (2013.01); *G06F 21/6218* (2013.01); *G06F 2221/032* (2013.01); *G06F 2221/2113* (2013.01)

(58) Field of Classification Search
CPC .................. G06F 21/84; G06F 21/604; G06F 2221/2113; G06F 2221/032
See application file for complete search history.

(56) References Cited

U.S. PATENT DOCUMENTS

| 7,013,332 | B2 | 3/2006 | Friedel et al. |
| 7,404,203 | B2 | 7/2008 | Ng |
| 7,882,539 | B2 | 2/2011 | Paramasivam et al. |
| 8,127,366 | B2 | 2/2012 | Vainstein et al. |
| 8,381,306 | B2 | 2/2013 | McPherson et al. |

(Continued)

OTHER PUBLICATIONS community.microstrategy.com [online], "Privileges and Security Access in Workstation," Jan. 2019, retrieved on Jan. 22, 2021, retrieved from URL <https://community.microstrategy.com/s/article/Workstation-Feature-Privileges-and-Security-Access?language=en_US>, 17 pages.

*Primary Examiner* — Ellen Tran

(74) *Attorney, Agent, or Firm* — Fish & Richardson P.C.

(57) ABSTRACT

Methods, systems, and apparatus, including computer programs encoded on computer-storage media, for enforcing policies for computing devices. In some implementations, content for presentation by an electronic device is received. Context data indicating a current context of the electronic device is obtained. Policy data indicating a policy corresponding to at least one of the electronic device, a user of the electronic device, the content for presentation, or data associated with the content is accessed. The policy indicates one or more context-dependent limitations on presentation of the content by the electronic device. Presentation of the content by the electronic device is managed based on a set of actions the policy permits for the current context.

20 Claims, 4 Drawing Sheets

(56) References Cited

U.S. PATENT DOCUMENTS

| | | |
|---|---|---|
| 8,881,229 B2 | 11/2014 | Barton et al. |
| 9,270,701 B1 | 2/2016 | Lamb et al. |
| 9,736,029 B2 | 8/2017 | He et al. |
| 10,200,454 B1 | 2/2019 | Lewis et al. |
| 10,326,765 B2 | 6/2019 | Hadar |
| 10,601,875 B2 | 3/2020 | Goldschlag et al. |
| 2011/0231900 A1 | 9/2011 | Shimoe |
| 2011/0296430 A1 | 12/2011 | Jandhyala et al. |
| 2012/0246695 A1 | 9/2012 | Cameron |
| 2016/0183164 A1 | 6/2016 | Pelkey |
| 2017/0255786 A1* | 9/2017 | Krishnamurthi ........ G06F 3/013 |
| 2018/0307871 A1* | 10/2018 | Rollins .................... G09G 3/38 |

* cited by examiner

ENFORCING AUTHORIZATION POLICIES FOR COMPUTING DEVICES

CROSS-REFERENCE TO RELATED APPLICATION

This application claims the benefit of U.S. Provisional Application No. 62/936,934, filed Nov. 18, 2019, and titled "Enforcing Authorization Policies for Computing Devices," which is incorporated by reference.

BACKGROUND

The present specification relates to enforcing authorization policies for computing devices.

SUMMARY

In some implementations, a computer system includes devices, gateways, servers, and other elements that are configured to apply multiple levels of policies to govern the behavior of devices. The policies can set limits on the access to and use of data where the limits vary depending on the context of a device. For example, a device may have a context that reflects its current situation, e.g., other devices nearby, people nearby, the location of the device, the type of data being accessed, and so on. When a user attempts use of a device, e.g., to display a document or other content, the system can verify whether applicable policies authorize the attempted use in the current context. If the policies do not authorize the use, various elements of the system can restrict or modify actions of the system.

As an example, a document containing confidential information may have an associated policy that restricts presentation when anyone without a specific authorization level is present. When a user attempts to display the document, the system may determine that the policy is not satisfied because a non-authorized person is nearby or because on a device is in a situation that is classified as a public setting. As a result, the system may block presentation of the document, or may present the document with the confidential information omitted.

One of the functions and advantages of the system is the ability to protect and reduce load on cloud computing services. Some servers may provide large database-orientated services, such as for business intelligence or other data analytics. Scaling these and other services can be costly, and may not be possible given the size of the service. Protecting the service from unwanted requests or unauthorized requests can provide increased service without increasing the size of the cloud computing footprint (e.g., amount of processing resources required). Implementing an authentication and authorization gateway in front of a server can limit requests to the server by denying access for unauthorized users or denying requests from authorized users that are not authorized for specific data or presentation layers. A policy server provides a role-based template that can service more than one server or service.

Another function and advantage of the system is the ability to prevent data leakage from enabled presentation devices, e.g., smart display devices. Some presentation screens can be shared for data consumption and discussion. As discussed below, smart presentation screens can adapt the presentation layer due to changing physical environmental context and logical context. When utilizing a large presentation screen, viewing sensitive data can be problematic when an unauthorized person comes into viewing distance of that screen. The screen can be configured to discover the new person within viewing proximity, check the person's authorization against the policy of the device (as well as potentially the policies for an application, dataset, etc.) and automatically hide the data to prevent viewing by the unauthorized person. In addition, an initial presentation request can be checked with respect to a policy to prevent data from being displayed if unauthorized. Various contextual factors can be used to determine whether a policy authorizes an action. These contextual factors can include one or more of: a setting that the screen is located in (e.g., a private, semi-private, or public setting); the classification of an application, dataset, object, or content; a person requesting the action; a number an identity of people within viewing distance; location (e.g., a geo-fence); and time (e.g., a time-fence or schedule restriction).

The policy management techniques can be used for shared-screen devices, for example, devices with a screen that may be used by different users or different groups of users at different times. Examples include computers in a lobby, televisions in a conference room, tablet computers that are available for multiple users, and so on. This type of device often needs to be able to perform authentication of a user and to determine the authorization to access content.

In some implementations, Internet-of-Things (IoT) devices have policies defined so that the behavior of the devices is different in a private setting (e.g., in a user's office), a semi-private setting (e.g., in a hallway of the company's building), or a public setting (e.g., on-stage at a conference). The policies can be enforced by the endpoint devices, e.g., display devices such as a television or computer monitor, by network infrastructure (e.g., routers, switches, hubs, access points, etc.), and/or other portions of a computer system. In many cases, by evaluating and enforcing authorization policies at the edge and/or network infrastructure, the system can reduce load on server systems to improve efficiency. For example, the system can alter or block requests to a cloud computing service when presentation of the content would not be authorized. This can free up bandwidth and processing capability of the cloud computing service and permit higher throughput, as the cloud computing service does not need to provided content that would not ultimately be authorized for presentation.

The techniques for setting and enforcing policies for data access and data use can facilitate the integration of many components of an analytics system. For example, the policy framework can be used to provide content across multiple platforms (e.g., mobile devices, television displays, desktop computers, etc.) in a context-dependent way. The policies can be enforced in a distributed manner at the respective devices where presentation is requested, so that the policies are applied to interactions with database servers, application servers, file servers, and more without requiring each of the back-end components to be aware of the presentation context and corresponding policies.

The system can apply policies that operate at different levels. For example, the system may apply a user-level policy, a device-level policy, a content-level policy, and/or a data-level policy. The user-level policy may specify which actions or uses are available to different users or categories of users. The device-level policy may specify how a device or category of devices are permitted to operate. The content-level policy can specify how certain content (e.g., a document, a page or portion within a document, etc.) can be used. The data-level policy can specify how individual portions of a data set, including specific attributes, metric, or calculation results derived from them, can be used. Each of these policies can indicate different behavior of the system for different contexts or situations. For example, any of these types of policies can indicate that presentation of content is permitted in some contexts but not in other contexts.

The policies can be defined to act at different levels or layers of the computing system. For example, some policies may act at the data layer, limiting what records and values can be accessed or retrieved based on context. Some policies may act at a presentation layer, limiting the documents, renderings, or other outputs that can be generated. Some policies may act at a device layer, limiting the actions that a device can perform. Some policies may act at a network layer, limiting which requests or messages over a network can be forwarded or acted on, before the requests reach their intended destination. For example, a device may send a request for content and data indicating the device's context. A router may determine, based on one or more policies, that the request calls for content that is not authorized to be presented in the device's context. In response, the router may respond to the request and send a message denying the request, without the need to inform the server for which the request was originally intended.

In many cases, the policies are enforced in a distributed manner, with many different user-facing or "edge" devices each applying policies affecting presentation of content. In addition, or as an alternative, servers and network devices (e.g., switches, routers, gateways, hubs, access points, firewall devices, etc.) may apply the same or different policies to customize their behavior based on context. In some implementations, the context information that facilitates the enforcement of policies can also be used to add contextual awareness for the presentation of information cards. For example, information cards can be redacted or enhanced based on the current context. Similarly, retrieval or display of portions of an information card or of an information card as a whole may be blocked if policies do not authorize presentation in the current context.

Consider an example where an employee is on stage at a conference and asks a smart television to display a document with salary data. The device determines its context, which may include a classification indicating that the television is in a public setting. This classification may be made based on detection of many people are nearby, a location of the television, or other factors. The device also determines that is a policy that applies, for example, to the device, to the user making the request, the requested document, and/or to the data in or relied on by the document. The device determines that there is a policy that applies and restricts presentation of data labeled as sensitive in a public setting. As a result, the device can block presentation of the document or provide a view of the document that automatically redacts the pages or values that include salary data labeled as sensitive.

In a different context, the result may be different. In a semi-private setting, such as in a conference room, other contextual factors such as the identity of people present may determine whether and how the content is displayed. For example, policies may require that the salary data can be presented only to users having a particular level of authorization, and so when a person that does not have the required level of authorization is present the data will not be displayed. If the unauthorized person leaves and only appropriately authorized people remain, the device may detect the change and present the sensitive content in response.

To facilitate the enforcement of policies, content can be categorized and classified. For example, individual resources as well as portions of them and even specific values can be labeled in metadata to indicate the level of authorization required for access. In some cases, certain executives may be permitted to view certain records or columns of data due to their job role or credentials, while other users are blocked from receiving the data. The view of a document that is presented can be dynamically altered based on the data labels and the current context, e.g., to remove elements from the document that require higher authorization than is provided by the current context.

As another example, a digital concierge service can be provided using a publicly available screen of a computer or television. The device can be configured to determine the identity of a person that approaches the screen, and then provide a customized display based on the person's identity. For example, the system may point the user in the direction if the user's next meeting at a conference, based on accessing the user's registration schedule. In many other situations, a screen and other associated hardware can determine the identity of a person nearby and customize the access and display privileges based on the detected identity and the context of the device. This can result in, for example, customized search functionality, customized application behavior, and customized user interface presentations that vary according to contextual factors.

In some implementations, a method performed by one or more devices including an electronic device. The method can include: receiving, by the one or more devices, content for presentation by the electronic device; obtaining, by the one or more devices, context data indicating a current context of the electronic device; accessing, by the one or more devices, policy data indicating a policy corresponding to at least one of the electronic device, a user of the electronic device, the content for presentation, or data associated with the content, where the policy indicates one or more context-dependent limitations on presentation of the content by the electronic device; and managing, by the one or more devices, presentation of the content by the electronic device based on a set of actions the policy permits for the current context.

In some implementations, the receiving, obtaining, accessing, and managing are performed by the electronic device.

In some implementations, the electronic device is a television or a computer monitor.

In some implementations, managing presentation of the content by the electronic device includes: determining, based on the context data, that the policy permits presentation of the content by the electronic device in the context indicated by the context data; and in response to determining that the policy permits presentation of the content, causing the electronic device to present the content.

In some implementations, managing presentation of the content by the electronic device includes: determining, based on the context data, that the policy (i) permits presentation of a first portion of the content by the electronic device in the context, and (ii) disallows presentation of a second portion of the content by the electronic device in the context; and in response to the determination, causing the electronic device to (i) present the first portion of the content and (ii) omit the second portion of the content from presentation.

In some implementations, managing presentation of the content by the electronic device includes: determining, based on the context data, that the policy permits presentation of the content by the electronic device in the context indicated by the context data; and in response to determining that the policy permits presentation of the content, blocking the electronic device from presenting the content.

In some implementations, the policy is a policy that corresponds to the electronic device, and the policy limits actions of the electronic device in different ways for different contexts of the electronic device.

In some implementations, the policy is a policy that corresponds to the user of the electronic device, and the policy specifies different sets of actions that the user is authorized to perform in different contexts.

In some implementations, the policy is a policy that corresponds to the content for presentation, and the policy specifies different actions available to be performed with the content in different contexts.

In some implementations, the policy is a policy that corresponds to data associated with the content, and the policy limits actions that can be performed using individual data elements associated with content in different contexts.

In some implementations, portions of the content or data elements associated with the content have assigned categories, and the policy indicates different actions that are authorized for different categories given the context.

In some implementations, the content includes a document, and different categories are assigned for at least some of the document, a page of the document, an item in the document, and a data value in the document; and managing presentation of the content includes using the policy and the assigned categories by (i) permitting presentation of portions of the document assigned a first category that the policy authorizes to be presented in the current context, and (ii) disallowing presentation of portions of the document assigned a second category that the policy does not authorize to be presented in the current context.

In some implementations, the assigned categories include categories that respectively denote content authorized to be presented in public settings, semi-public settings, and private settings.

In some implementations, accessing the policy data includes obtaining multiple policies that are applicable to the current context. Managing presentation of the content includes causing the electronic device to present only portions of the content are authorized for presentation by each of the multiple policies.

In some implementations, the context data indicates one or more of a location, a time, an event, a number of people near the electronic device, an identity of a person near the electronic device, or another device near the electronic device.

In some implementations, the method includes: determining an identity of a person in an environment of the electronic device; and selecting a policy based on the identity of the person.

In some implementations, the method includes: detecting a change in the context of the electronic device; determining, based on the policy data, that the policy authorizes a different type or amount of presentation of the content; and modifying the presentation of the content in response to determining that the policy authorizes a different type or amount of presentation of the content.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
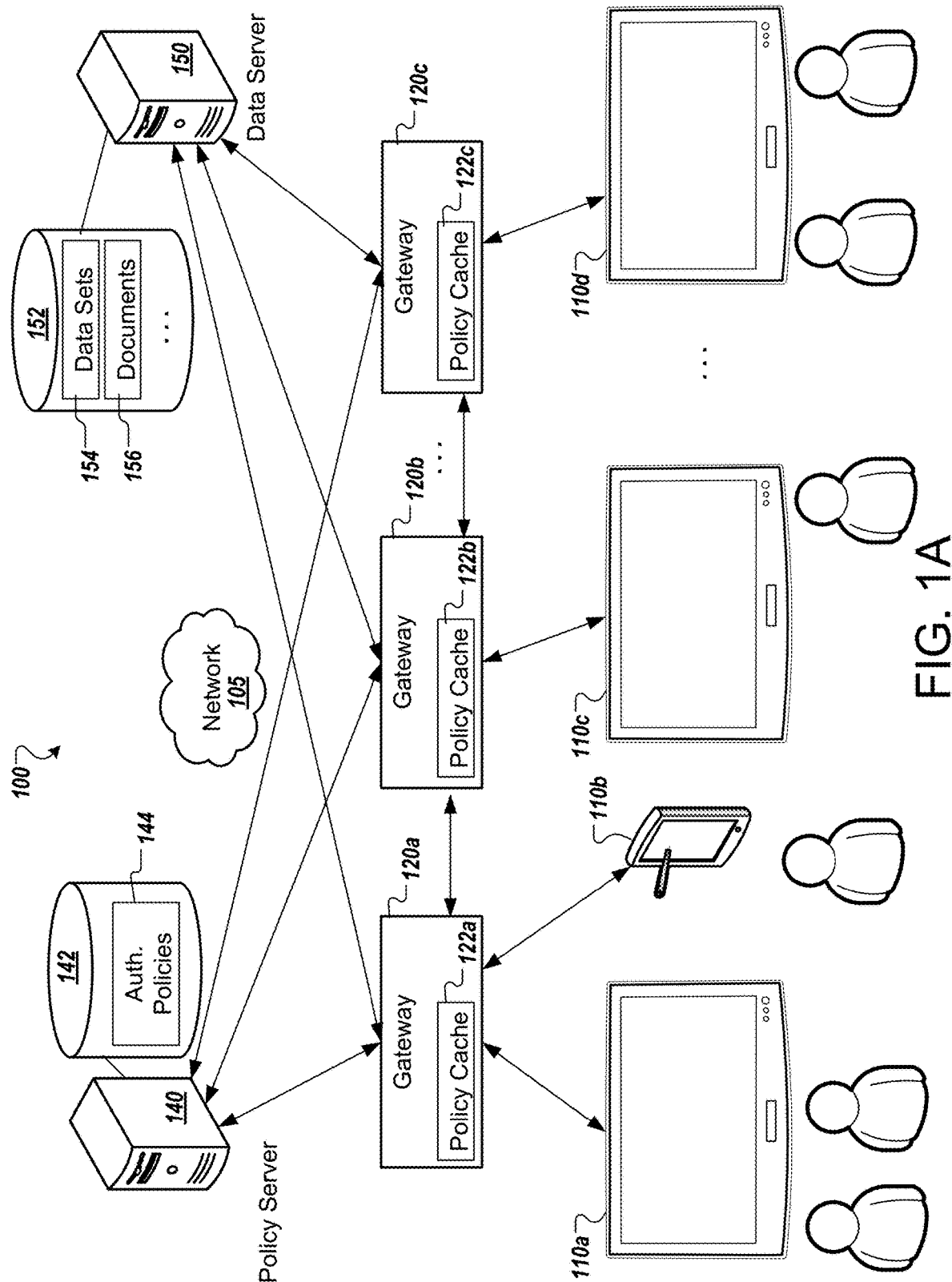
FIG. 1A is a diagram showing an example of a system for enforcing authorization policies for computing devices.

FIG. 1 is a diagram showing an example of a system 100 for enforcing authorization policies for computing devices. The system 100 includes a variety of devices 110a-110d that can be user-facing devices, such as devices having a display screen. The system 100 uses one or more policies that govern authorization for the devices 110a-110d to perform actions in different contexts.

Each of the devices 110a-110d is connected to a network 105 through a gateway 122a-122c. As discussed below, the devices 110a-110d and/or the gateways 122a-122c can obtain policy data and context data to determine whether actions are authorized. The system 100 includes a policy server 140 that provides policy information to the components of the system 100. To fulfill requests and provide content to the devices 110a-110d, the system also includes one or more servers, e.g., a database server, a search server, a file server, a document collection server, an application server, etc., denoted simply as a data server 150 for clarity in illustration.

The system 100 can provide distributed authentication and authorization services that operate at the edge and intermediate portions of a network rather than only at a back-end server. This technique can be used to reduce load on the cloud computing services. For example, by distributing authentication and authorization services to user-facing devices, gateways, and other devices, authentication and authorization decisions can be made at an earlier stage. Authorization decisions can be made before a server receives a request to act on, and requests that are not authorized can be blocked before they reach a server. This can improve the ability of servers to scale to service larger numbers of devices and users, because the servers have less capacity taken up by unauthorized or unnecessary requests. The servers can also provide better responsiveness to the users (e.g., lower latency and high availability especially when connectivity between the edge and servers is interrupted). While providing these advantages, the system 100 can still collect telemetry data and transmit the data to platform analytics.

The illustration of the system 100 emphasizes the use of policies to perform distributed authorization processing. Similar techniques can be used to provide distributed analysis processing also. For example, when a set of user transactions involves one edge component or just a few edge components, there is often no need to transfer all of the related data to back-end servers for processing. As a result, when components of the system 100 determine that analysis needs or transactions can be met through local processing or through processing of various edge devices, the processing can be done without relying on remote servers.

In the example of FIG. 1, the devices 110a-110d can be Internet-of-Things (IoT) devices that are connected to a network (e.g., a local area network (LAN), a wide area network (WAN), etc.). The devices 110a-110d each detect information about the context in which they are located, e.g., location, time, number of people nearby, type of room, level of privacy available, and so on. For example, devices 110a-110d may determine their locations using a global positioning system (GPS) receiver, detection of messages from location beacons (e.g., via Bluetooth), detection of Wi-Fi access points and other infrastructure, user input, information captured from a camera, and so on. A camera can capture information about how many people are nearby. With face identification and information from a user database, devices can determine the identities of people detected nearby and whether people nearby are unidentifiable. A camera can provide images used to determine the nature of the setting for the device, e.g., whether the device is in a public place, and enclosed space, etc. As another example, a microphone of a device can be used to determine noise levels and types of ambient sounds that can also indicate the type of setting the device is in. Similarly, audio data obtained using a microphone can be used to identify specific users (e.g., using speaker identification, comparing with voiceprints, or other techniques) or to evaluate how many users are present. Other data can be used to determine context, such as calendar data or user input that indicates the locations and times of events, so that devices can determine whether they are involved in certain events. As another example, information about the type, number, and identity of devices nearby can be used to determine the context. For example, the detection of cell phones of users can indicate the presence of the associated owners of the phones.

As devices 110a-110d monitor their contexts, various actions may be requested for the devices 110a-110d to be performed. These actions may be requested by users, e.g., people physically present locally with the devices 110a-110d. Other actions may be requested remotely or be initiated by a remote user over a network, an application, a service, an application programming interface (API), etc. Many types of actions may be requested, e.g., to perform a search, to answer a question, to retrieve a document, to provide a recommendation, to open an application, to interact with a user interface or application, or to access or manipulate data. For example, actions may respectively create, read, update, delete, edit, share, present (visually, audibly, or in another form), or otherwise access content.

Regardless of the source of a requested action, the individual devices 110a-110d can apply context-dependent policies to determine whether the requested action is authorized. The context of a device 110a-110d often affects whether the action is authorized or not. Actions that are authorized in one context may not be authorized in another context. For example, applicable policies may authorize a device to display salary data to a manager when alone in his or her office. However, the policies may not authorize the same device to display the same data if located in a conference room, or even in the manager's office if additional non-manager people are detected to be present.

Rather than request that a remote server authorize each action, devices 110a-110d can themselves apply the applicable policies and determine whether actions they are requested to perform comply with applicable policies. This can significantly reduce the amount of traffic over a network with many IoT devices and can significantly reduce the processing load on access control servers. In particular, policies may affect actions and options in a fine-grained manner, potentially applying differing levels of authorization to different pages, items, data values, and controls (e.g., buttons, links, sliders, etc.) of documents individual and user interfaces. Requesting authorization for actions for each of these different many content elements would often create excessive network traffic and undesired latency if a network round-trip were needed for each authorization decision. Nevertheless, with devices 110a-110d able to evaluate their contexts and make the authorization decisions locally, latency is reduced and unnecessary network traffic is avoided.

To evaluate whether an action is authorized, a device 110a-110d obtains the applicable policies for the action. There may be multiple policies that apply to a given situation, as discussed further below. One policy may apply to a specific device. Another policy may apply to the current user of the device. Another policy may apply to the content being acted on, such as the application, document, or other content being accessed. Another policy may affect specific data items (e.g., tables, columns, values, or other portions of data sets) to limit how the data can be used. Another policy may apply to a specific location. Accordingly, a device 110a-110d can use context data indicating the current situation or environment of the device 110a-110d to determine which policies should be obtained and evaluated.

A device 110a-110d can request policy data from a policy server 140 or other policy service. The policy server 140 has access to data storage 142 that includes authorization policies 144 for many devices, users, content, data, etc. in the system 100. Requests for policy information can be provided to the policy server 140 through one or more gateways 120a-120c. The gateways 120a-120c can each have a policy cache 122a-122c that stores recently requested or frequently requested policies. When the requested policy or policies are available from the cache 122a-122c, a gateway 120a-120c can provide the policy or policies without contacting the policy server 140. the gateways 120a-120c can also communicate with the policy server 140 to verify that the policies stored in the cache 122a-122c are up to date. If the policies needed are not in the cache 122a-122c of one gateway, the policies can be obtained from the caches 122a-122c of other gateways and/or from the policy server 140 and returned to the requesting device 110a-110d. The device 110a-110d can also maintain a local cache of policy data.

Once a device 110a-110d obtains the policy data for applicable policies, the device evaluates whether the policies authorize the requested action. As discussed above, the action may be to display content, to send a request to the data server 150, to access content, or to perform another action. If the action is authorized by the policies, e.g., not disallowed by any of the policies, then the device 110a-110d performs the action. If the action is not authorized, e.g., if one or more policies do not allow the action to be performed, then the device 110a-110d blocks the action. In many instances, devices 110a-110d can obtain, evaluate, and enforce the applicable policies without ever contacting servers over the network 105.

In some implementations, the gateways 120a-120c can also obtain and apply policies, for example, to requests that are provided to them from devices 110a-110d. For example, when a device 110a-110d requests a document, the gateway 120a-120c that the request is passed to can evaluate whether the device, given its context, would be authorized to obtain and/or present the requested document. If the device is not authorized to obtain the document, then the gateway 120a-120c can block the request and not forward it on to the data server 150 for which it is intended. Instead, the gateway 120a-120c can respond to the request and indicate that the request is denied. As another example, the gateway 120a-

120c may modify a request from a device 110a-110c to limit or otherwise alter the request to request only content that is authorized.

As an example of interactions to obtain policy data, a device 110a is first enabled with software to enable the processing and enforcement of policies. The device 110a fetches any policy that is applicable to its context but is not locally cached or is stale in the cache. The gateways 120a-120c have a workflow engine that can check the authentication of the device 110a, including determining whether the device 110a is allowed to fetch policies (e.g., does a device policy for the device 110a allow downloading of policy data). The workflow engine of a gateway 120a-120c fetches the policy document from a database or policy server 140 and returns the policy data to the device 110a.

Figure 1B:
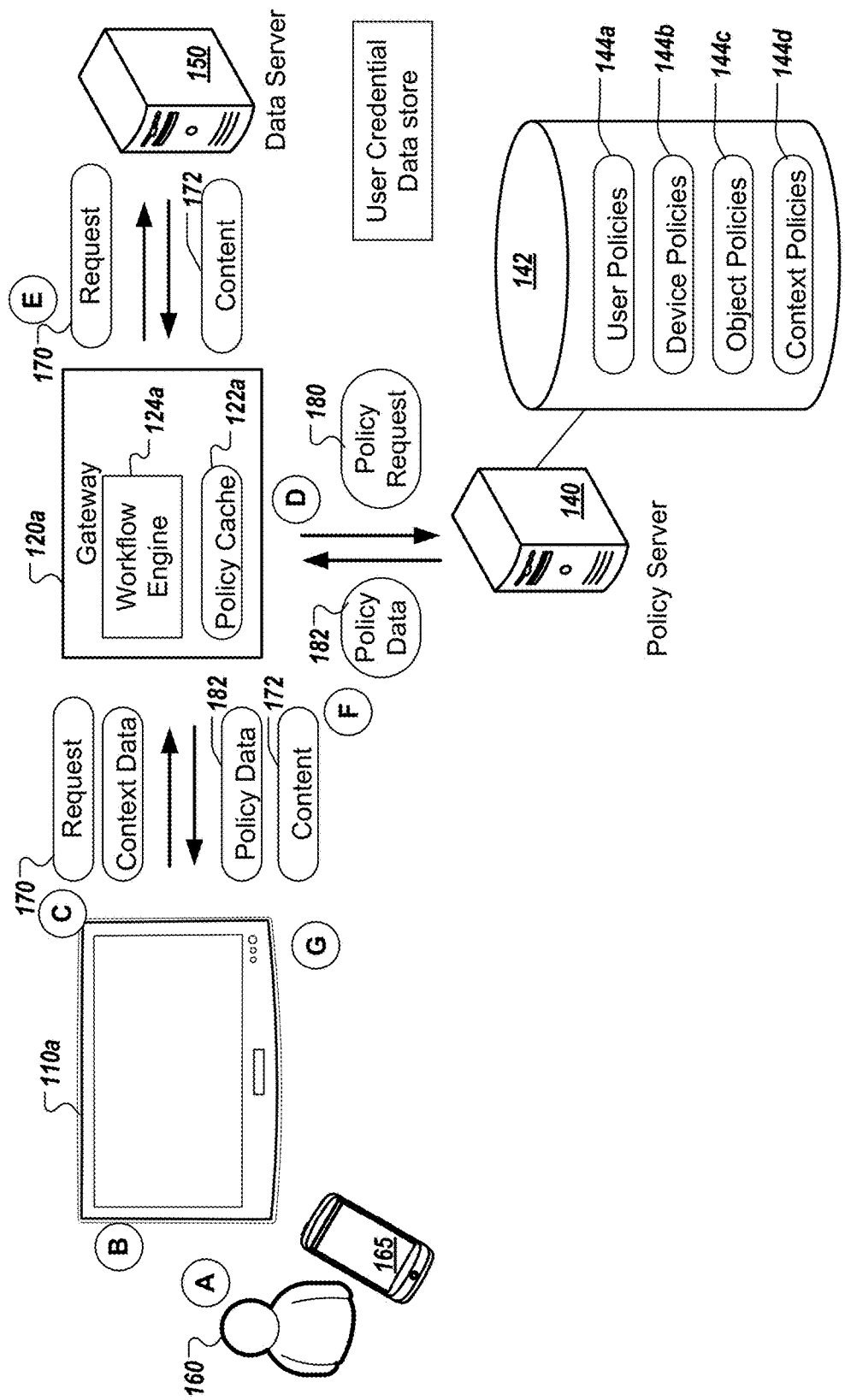
FIG. 1B is a block diagram showing an example of interactions for enforcing authorization policies for computing devices.

FIG. 1B is a block diagram showing an example of interactions for enforcing authorization policies for computing devices. FIG. 1B shows a subset of the components of the system 100 of FIG. 1A with additional information showing the flow of data within the system 100. FIG. 1B shows a series of operations labeled stages (A) through (G), which may be performed in the order indicated or in a different order. The device 110a can represent a presentation device, which may be a shared device or multi-user device. Typically, the device 110a includes a screen for displaying information, but the device 110a may additionally or alternatively provide information through an audio interface, such as a voice response system.

In stage (A), a user 160 approaches the device 110a and interacts with the device 110a. The interaction may be direct, e.g., with a touch input or voice input to the device 110, or may be indirect, e.g., using a user device 165 to communicate with the device 110a or request an action by the device 110a. The user input requests some action to be performed. For example, the user may speak a query or enter a request for a document to be retrieved. In some cases, simply the user 160 approaching the device 110a may serve as a request that causes the device 110a to detect the user and determine whether the device 110a is authorized to present an interface (e.g., unlock) for the user to obtain access.

In stage (B), the device 110a determines its current context and authenticates the user 160. The device 110a can evaluate various contextual aspects to characterize the context of the device 110a. As a few examples, the device 110a can determine its location, using GPS, detected location beacons, detected Wi-Fi access point signals, or other data. The device 110a can use one or more cameras to capture images of the surroundings. The images can be used to identify the number of people near the device 110a and the identities of people near the device 110a, as well as whether there are unidentifiable people nearby. The location information and images can be used to determine the setting for the device 110a, for example, whether the device 110a is in a private setting such as an office, a semi-private setting such as a conference room, or a public setting such as a public lobby, a ballroom, a hallway, etc. The device 110a can detect the presence of other devices, such as phones of users, computers, televisions, projectors, appliances, and so on, as part of determining the context.

From these types of information and others, the device 110a generates context data 171 that describe the current context. This context data 171 may indicate specific data identified (such as the identities of a specific location, user, or device nearby) and/or may indicate a more general classification of the context, such as private, semi-private, or public. In some implementations, a machine learning model has been trained to evaluate context data and provide a classification for the context and/or likelihoods that one or more contexts apply. The device 110a can store and use the machine learning model to generate at least a portion of the context data 171. In some implementations, the context data 171 indicates values for a predetermined set of features, e.g., whether or not an unidentified person is present, whether or not an authorized user has been identified, a total number of people present, and so on.

The device 110a can detect, identify, and authenticate the user 160. Various techniques can be used to do this. In some cases, the user 160 may log in by providing a user name, password, and/or other credentials that the device 110a can verify. In other cases, the device 110a may detect the presence of a trusted device (e.g., an authentication token), such as the user's phone, that has been previously registered or otherwise associated with the user 160 as evidence of the user's presence. The device 110a may additionally or alternatively obtain biometric data, e.g., through a fingerprint scan, a speech sample, a face image, a retina scan, etc., and the device 110a can compare characteristics of the biometric data with biometric characteristics in a user profile for the user 160. For any of these authentication approaches, the device 110a may locally store user profiles or other data for verifying identity of at least some users, such as a subset of users that have previously used the device 110a or who frequently use the device 110a. The device 110a may additionally or alternatively communicate with a server or authentication service over a network to authenticate the user 160.

At this stage, the device 110a may have locally stored policy data that is applicable to the device 110a, the user 160, the current context, and/or the request of the user 160. If so, the device 110a may determine whether the requested action(s) comply with the applicable policy or policies. For example, the device 110a may have multiple operating modes that are allowed depending on the context in which the device 110a is located. For example, different sets of applications or interactions may be authorized in the private setting than in the public setting, even for authorized, authenticated users. Accordingly, the device 110a may provide a user interface or interaction with the user 160 that satisfies the user request to the extent permitted by the applicable policies. If the user's request is known to violate an applicable policy, such as the policy for the device 110a, then the device 110a may deny the request and block the requested action from being performed.

In many cases, the device 110a may not have the policy data or content needed to fully respond to the user's request. For example, even if the device 110a determines that the user 160 is authorized to initiate an action in the current context, such as to submit a query and receive results, the device 110a likely needs to obtain the results or other content over a network. As additional examples, the device 110a may not store all of the policies that are applicable to the current context and user 160, or may desire to verify that its policies are up to date, and so may In stage (C), the device 110a sends a request 170 to a gateway 120a. As noted above, the device 110a has found that at least initiating the requested action satisfies the policies for the device 110a given the current context. In the example, the request 170 is directed to the data server 150, and requests information to present to the user 160. For example, the request 170 may be a request for a specific document or other content, a call using an application programming interface (API), a request for recommendations, a request to provide results for a query, etc.

In some implementations, the device 110a may also send context data 171 indicating at least some aspects of the context in which the device 110a is located. This can enable the gateway to determine whether the request 170 and/or responses to the request 170 satisfy applicable policies.

The device 110a may send a request, directed to the gateway 120a and/or to the policy server 140, to obtain policy data. In some implementations, no explicit request is needed, and the gateway 120a can obtain and provide appropriate policy data as part of responding to the request 170. This may help ensure that when the device 110a receives content for presentation, the device 110a also has the policies the device 110a needs to determine which uses for the content are authorized.

In stage (D), the gateway 120a processes the request 170. The gateway 120a includes a workflow engine 124a that can run various analysis tasks on incoming requests. These tasks can include routing requests and network traffic generally, as well as obtaining policy data, applying policy data, generating responses, modifying or re-directing requests based on policies, evaluating context data, and more. Typically, the workflow engine is able to run customizable workflow module that system administrators can create and update to perform various functions in the network.

In general, the gateway 120a can include software to enable processing and enforcement of policies, e.g., a policy software development kit (SDK). The gateway 120a is then able to determine whether actions requested by devices are authorized by policies and allow or deny the actions, whether or not the devices have the capability to process and enforce the policies. In some implementations, the gateway 120a will authenticate and check any client request without a valid session against the policy for that client device and/or the associated user. Any client request that does not meet the policy requirements is rejected prior to reaching the target application or service.

The gateway 120a has a policy cache 122a that stores data for recently used or frequently used policies. The gateway 120a can determine whether the policy cache 122a includes each of the policies applicable to the request 170, which may include, e.g., a policy for the device 110a, for the user 160, for the context indicated by the context data 171, for the content requested by the request 170, and/or for data or data sources that the requested content includes or relies on. The gateway 120a can assess the request 170 and context data 171 to determine which policies are needed to make a determination whether the request 170 is authorized.

If the policy cache 122a does not store the appropriate policy data, the gateway 120a sends a policy request 180 to a policy server 140. The policy server 140 has access to data storage 142 that stores user policies 144a, device policies 144b, object policies 144c, context policies 144d, and any other policies needed in the system. In response to the policy request 180, the policy server 140 provides policy data 182 for the requested policies. In some implementations, the policy request 180 may indicate aspects of the context of the device 110a, so that the policy server 140 may determine which policies, out of the various sets of policies 144a-144d, are applicable to the request 170 and thus the request 180.

Once the gateway 120a has obtained the appropriate policies, the gateway 120a determines whether the policies authorize the request 170 to be made to the data server 150. In performing this function, the gateway 120a can prevent the data server 150 from receiving and processing requests that are not authorized. It would be inefficient to provide a request to the data server 150 and incur processing by the data server 150, only to find that applicable policies did not allow the request 170 to be acted on, or that the results could not be presented at the device 110a even if provided. By applying the policies, the gateway 120a can filter out requests that are not authorized to be fulfilled, or which would provide data that is not authorized to be displayed by the device 110a in the current context, and thus significantly reduce the load on the data server 150 and reduce the amount of traffic through the network. Accordingly, if the gateway 120a determines that the applicable policies do not authorize the request 170 given the context of the device 110a, the gateway 120a can block the request 170 from reaching the data server 150, and the gateway 120a can inform the device 110a that the request 170 is denied. In the particular example of FIG. 1B, however, the gateway 120a determines that the request 170 is authorized and so the request 170 is forwarded on to the data server 150.

In some cases, the policies may authorize only a portion of the request 170 or may require changes to the request 170 in order to be authorized. In these cases, the gateway 120a may automatically modify the request 170 in order to comply with the policies rather than rejecting the request 170 outright. For example, if the request 170 attempts to access a data source that is not authorized for the current context of the device 110a, the gateway 120a may substitute a different data source, for example, one that does not contain sensitive information. As another example, if a document has portions that require different levels of privileges to access, the gateway 120a may alter the request 170 to request only the portions of the document for which appropriate privileges have been proven. As another option, the gateway 120a may reject a request 170 and indicate to the device 110a the reason or portion of the request that resulted in the rejection, allowing the device 110a to modify and resubmit its request 170 rather than the gateway 120a automatically making alterations.

In stage (E), the data server 150 receives and processes the request 170 and provides content 172 in response to the request 170. In the example, authentication of the user 160 and evaluation of the applicable policies (to the extent permitted by the request 170) have already been performed by the device 110a and/or the gateway 120a, reducing the amount of processing required by the data server 150. In some implementations, the gateway 120a provides to the data server 150 an authentication token or other data demonstrating the authentication that has been achieved. The content 172 may be any appropriate type of data. Examples include a document, data for a user interface or application, search results, objects (e.g., software objects, metadata, etc.), data from a data set, recommendations, data for display in a user interface, etc.

In stage (F), the gateway 120a receives and processes the content 172 from the data server 150. This can involve applying the policies applicable to the current context of the device 110a. Although the policies have been applied earlier, the specific content 172 of the response from the data server 150 was not known previously. Accordingly, the applicable policies may affect the manner in which the content 172 can be provided to and used by the device 110a. For example, if the content 172 is a document, the initial request 170 may indicate a document identifier or type of document being requested, allowing policies to be applied. However, even if the document is authorized to be provided or displayed in a general sense, there may be elements of the document that are not authorized to be provided or displayed. For example, some pages, values, or objects in the document may include sensitive information classified as requiring a higher permission or authorization level than others. Accordingly, the applicable policies can be evaluated to address the content 172 of a response to the request 170. If a portion of the content 172 is not authorized, the unauthorized portion may be omitted or replaced to create a modified version of the content 172 that satisfies the policies.

In the example of FIG. 1B, the device 110a is authorized to provide the content 172 in its current context. As a result, the gateway 120a forwards the content 172 to the device 110a. The gateway 120a also provides policy data 182 indicating the most current policies applicable for the device 110a and its context (e.g., policies for the device 110a, the user 160, the content 172, etc.)

In stage (G), the device 110a processes and presents the content 172 provided in response to the request 170. This can include applying the policies that are received in the policy data 182. The device 110a can confirm that the policies authorize the requested action before presenting the content 172. In many instances, the context of the device 110a may change rapidly. For example, people may come and go, the device 110a itself may be moved, other devices may enter and leave a range of proximity to the device 110a, and so on. Accordingly, the device 110a may repeatedly or continually verify that requested actions are authorized by, or are at least are not disallowed by, the policies for the user 160, the device 110a, the content 172, etc.

To apply applies policies, such as one or more of stages (B), (D), (F), and (G), a device can perform functions including those indicated in the example algorithm below. The pseudocode below shows actions of an "AuthorizeAction" function that may be called to authorize an action that is initiated by a user or a device. The process represented by this function may be performed by the device 110a, the gateway 120a, or another device in the system, or a combination of them. The process involves obtaining and applying (1) a device policy, which can indicate a classification of a device and permissions and/or restrictions regarding actions that the device can perform, (2) an object policy, which can indicate a classification for the object and permissions and/or restrictions regarding actions that can be performed using the object, and (3) a user policy, which can indicate a classification for the user and permissions and/or restrictions for actions initiated by or performed in the presence of a user or group of users (e.g., a class of users having a certain role or level of authorization). These actions can require actions to be authorized given the physical and logical context of a device 110a.

AuthorizeAction Function
    Values Sent: User ID, Policy Server ID (e.g., FQDN+port), Policy ID, Role ID, Action ID (for requested action), Object ID (for object requested)
    Has the device policy recently been cached?
        If not, then fetch the device policy
    Has the object policy recently been cached?
        If not, then fetch the object policy
    Does the classification of the object requested have the appropriate policy for the device classification?
        Yes:
            Has the user policy recently been cached?
                If not, then fetch user profile
            Does the user have the appropriate role and/or permissions to request the current action?
                Yes:
                      Respond that authorization is granted
                No:
                      Respond that authorization is denied
        No:
            Respond that authorization is denied The action authorization function can be configured to receive a number of parameters, including values for, e.g., a user identifier, a policy server identifier, a policy identifier, a role (e.g., of a device or user), an indication of an action requested, and/or an object requested. If the action to be performed or object to be retrieved is for a device different from the one performing the policy analysis, a device identifier can also be provided. The process determines whether a device policy for the corresponding device has been locally cached recently, e.g., within a threshold amount of time (e.g., within 1 hour, within 1 day, within an expiration period for the policy, etc.). The amount of time for which a cached policy is considered valid is configurable and updatable. If a recent and valid copy of the device policy has not been cached, the device policy is obtained, for example, from the policy server 140. The server to be accessed can be specified using a policy server identifier, which can be based on a fully qualified domain name (FQDN) and a port number. The process also includes obtaining an object policy for any objects involved in a requested action, in a similar manner that the device policy is obtained. The process then includes determining whether the object policy and the device policy permit the requested action using the requested object. To facilitate this, the requested object and the device can each have a classification, and the policies can be checked to determine whether the action is permitted for those classifications. The action authorization function can also obtain and apply a user policy. For example, the function can determine whether the user has an appropriate role or permission to be able to request or initiate the action being evaluated. If any of the policies for the device, object, or user disallow the requested action, the action is blocked. On the other hand, if the policies each permit the action, the authorization is granted and the action is allowed to proceed.

An example of a simple policy is shown below. This policy represents a policy for use of a data object in a context classified as "semi-private."

```
{
    "policy 1": {
        "policy id": "abc policy id",
        "object id": "123",
        "object type": "data",
        "classification": "semi-private",
        "roles": [
            {"role": "admin",
             "enabled actions": "11111"
            }
            {"role": "end user",
             "enabled actions": "11101"
            }
            {"role": "display device",
             "enabled actions": "01001"
            }
        ]
        "individuals": [
            {"individual name": "Bob Hope",
             "enabled actions": "11111"
            }
            {"individual name": "Dean Martin",
             "enabled actions": "01001"
            }
        ]
    }
}
```

In various places, the policy above specifies permissions using a 5-bit value. Each bit represents whether create, read, update, delete, and execute privileges are granted, respectively. The value "11111" indicates that all of these permissions are allowed. The value "01001" indicates that read and execute privileges are granted, but create, update, and delete privileges are not. Sets of privileges are defined for specific roles (e.g., the roles of "admin," "end user," and "display device"), which may represent classes of people and/or devices. Sets of privileges are also defined for specific individuals (e.g., "Bob Hope" and "Dean Martin").

Figure 2:
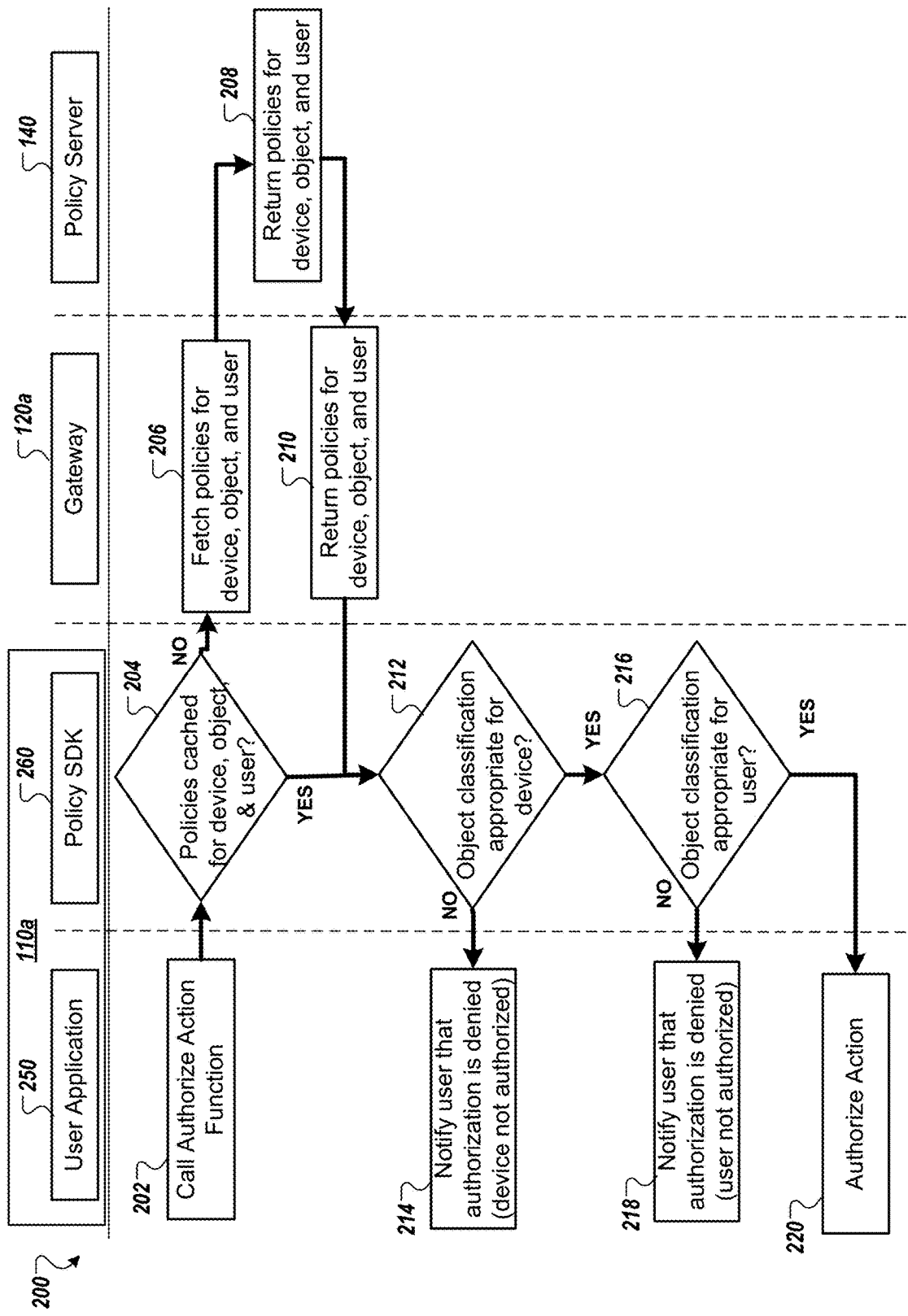
FIG. 2 is a flow diagram that illustrates an example of authorizing an action.

FIG. 2 is a flow diagram that illustrates an example of authorizing an action. The device 110a runs a user application 250 and also includes a policy SDK 260 that enables the device 110a to obtain and apply policies to manage presentation and other actions of the device. The device 110a communicates with the gateway 120a and the policy server 140 to determine whether an action is authorized given the current context of the device 110a.

In step 202, the application 250 calls the "Authorize Action" function provided by the policy SDK 260. In step 204, the policy SDK 260 determines whether a local policy cache of the device 110a stores policies for the device 110a, for the current user of the device 110a, and for any objects (e.g., data objects, resources, applications, etc.) involved in the action that the device 110a has been requested to perform.

If the policy cache of the device 110a does not store the appropriate user policy, device policy, and object policy, the device 110a sends a request for the policies needed. In step 206, the gateway 120a receives the policy request from the device and forwards it or generates a new request to the policy server 140. In step 208, the policy server 140 returns the policies for the device, object, and user to the gateway 120a. In step 210, the gateway 210 returns policies for the device, object, and user to the policy SDK 260 on the device 110a.

In step 212, the policy SDK 212 determines the classification (e.g. a type or category) for the object to be acted on, and determines whether that object classification is appropriate for the device 110a. In general, the requirements of the object policy and the device policy must all be satisfied to perform the requested action. In other words, using the object policy and device policy, the policy SDK 260 determines whether the device 260 is authorized to use the object, given the classification of the object. For example, the policy SDK 260 may access an object classification indicated in the object itself, in metadata for the object, and/or in the object policy. The policy SDK 260 may then determine whether the device policy 260 authorized the device 110a to access or use objects of that object classification. The determination can be made based on the specific context of the device 110a and the specific action that is requested. In other words, the device policy may specify different authorization for different contexts and for different actions. As a result, the context of the device 110a may be used to determine whether the device 110a, in the current context, is authorized to perform the specific action requested using the object under consideration. If the device 110a is not authorized to access, display, or otherwise use the object, the user application 250 is notified and the application 250 can also notify the user that authorization is denied in step 214.

In step 216, if the device 110a is authorized to use the object, the policy SDK 260 determines whether the object classification is appropriate for the current user of the device 110a, e.g., a user identified through log-in information, biometrics, or in another manner. This can involve determining whether the user policy for the user authorizes the requested action. As with the application of the device policy, the evaluation can take into account the current context of the device 110a as well as the specific action requested to be performed. If the user policy does not authorize use of the object in the requested manner, then the user application 250 is notified and the application 250 can also notify the user that authorization is denied in step 218. If the user policy does authorize the use of the object (e.g., and potentially the specific action in the specific type of context present), then the policy SDK 260 notifies the user application 250. The user application 250 can then perform the action requested, e.g., to display the object, edit the object, save the object, etc.

As an example, objects may be assigned a classification from multiple options such as "unclassified," "classified," "secret," and "top secret." A user policy may grant a user access to top secret information, yet still restrict the actions that can be performed in different contexts. For example, in a private setting, with no one else present that does not also have top secret clearance, the policy may allow many presentation actions with respect to a top secret data object at the local device 110a, e.g., open, edit, display, save, etc. The policy may restrict actions in other settings, however, by blocking display in a semi-private setting or public setting. Similarly, the policy may specify that even in the private setting, such as a private office, if the device 110a detects a person present that does not have top secret clearance or detects a person who is unidentifiable, then presentation of the data object should be blocked. Even though the user has the authorization or clearance to access the top secret data object, the policy still restricts the actions that can be performed in different contexts.

The authorization determination can be performed initially before performing an action, such as initiating display of data or other content. In addition, the authorization determination may be repeated or confirmed periodically. For example, the device 110a may initiate the authorize action to confirm authorization in response to the device 110a detecting a change in the context of the device 110a. As another example, authorization may be checked at an interval, e.g., every 5 seconds, every minute, etc. Consider an example in which an object classified as top secret is being displayed to a user having top secret authorization. If the device 110a detects that a person who does not have top secret authorization enters the room (or the person entering cannot be identified), then the device 110a may automatically remove display of the object because the action that is ongoing (e.g., display of the top secret object) is not authorized in the new context resulting from the new person entering the room.

In the example of FIG. 2, the object that is the subject of the requested action is not necessarily retrieved from a server. For example, the object may be (but is not required to be) stored locally at the device 110a. The object may be a document stored at the device 110a, may be an application or portion of an application stored at the device 110a, may be an API that the user application 250 is configured to call, or another resource.

Figure 3:
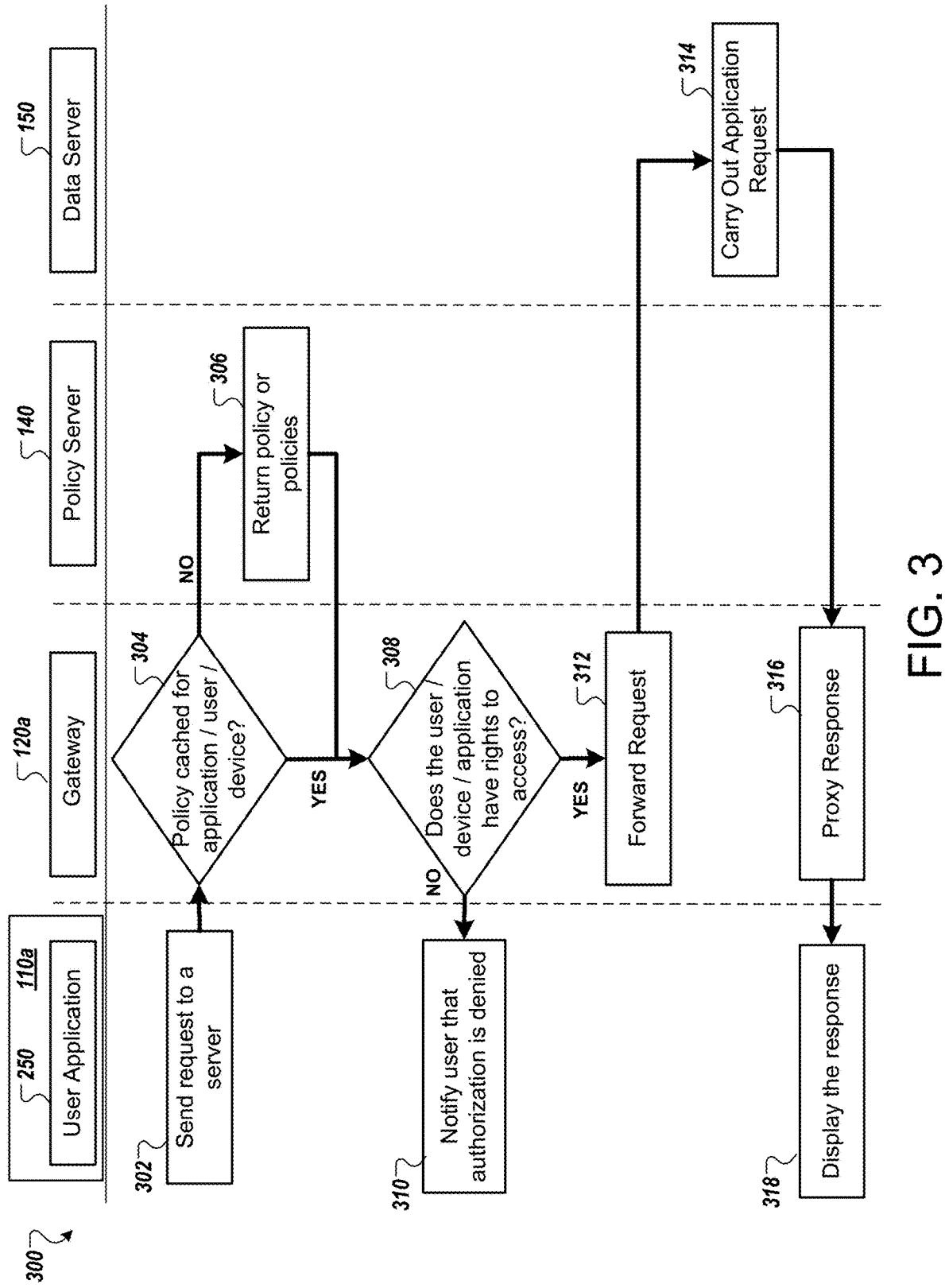
FIG. 3 is a flow diagram that illustrates an example of a policy gateway applying policies to protect cloud computing applications.

FIG. 3 is a flow diagram that illustrates an example of a policy gateway applying policies to protect cloud computing applications. For example, the diagram illustrates a process 300 that can be used to determine whether an attempt to access a cloud computing service or issue a request using an API is authorized, and to block the request from reaching the destination if not authorized.

In the example of FIG. 3, the gateway 120a evaluates policies to determine whether a request is authorized, rather than policy application being performed by the policy SDK 260 or other element of the device 110a. This enables the gateway 120a to enforce policies for requests to the data server 150 even if the device initiating the request does not have the appropriate policy SDK and so could not perform the analysis. Similarly, it enables the gateway 120a to protect the network and the data server 150 in the event that user devices are compromised or otherwise have the policy SDK disabled. In some implementations, in cooperation with the process 300, devices having the policy SDK 260 may themselves apply policies to manage requests to cloud computing systems and other services, in addition to or as an alternative to the policy enforcement performed by the gateway 120a. In addition, once a request has been authorized and data from the data server 150 is provided to the device 110a, the device 110a may still use the process 200 of FIG. 2 to verify whether specific actions involving the received content (e.g., display, execution, saving, etc.) are authorized in the context present at the time the requests are made.

In step 302, the user application 250 of the device 110a sends a request to a server. The request may be, e.g., a request to obtain a document, a request to obtain a recommendation or user interface content, a request to save or share content, a request to access a web application, a request to run a search based on a search query, a request to generate a data visualization, etc. The request can include or be accompanied by information that identifies the device 110a, the user application 250, and/or the user. Additionally or alternatively, a classification or category for the device 110a, application 250, and/or user can be provided in association with the request. Other context data may also be provided.

In step 304, the gateway 120a determines which policies apply to the request from the user application 250, and the gateway 120a determines whether the appropriate policies are cached at the gateway 120a. These may be policies applicable to the user application 250, the user, and/or the device 110a. If the policies are not all cached, the gateway 120a requests the needed policies, and in step 306 the policy server 140 provides the policies requested.

In step 308, once the policies are present at the gateway 120a, the gateway 120a determines whether the user, the application 250, and/or the device 110a are authorized to make the request. If not, the gateway 120a notifies the user application 250, and the user application 250 can also notify the user that authorization is denied in step 310. If the gateway 120a determines that the policies authorize the request to be made, then the gateway 120a forwards the request to the data server 150 in step 312.

In step 314, the data server 150 carries out the application request. This produces a response, and in step 316 the gateway 120a proxies the response to the user application 250. In step 318, the user application 250 receives the response to the request and processes the request. The user application 250 can invoke the "Authorized Action" function discussed in FIG. 2 to verify that actions involving the response content (e.g., displaying the response) are authorized in the current context. The user application 250 can then display the response or otherwise use the response requested from the data server 150.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method performed by one or more network devices, the method comprising:
   receiving, by the one or more network devices, a request to retrieve content from a server for presentation by an electronic device, wherein the request is received from the electronic device over a communication network;
   receiving, by the one or more network devices, context data associated with the request, wherein the context data is provided over the communication network and indicates a current context of the electronic device;
   in response to receiving the request and the context data over the communication network, accessing, by the one or more network devices, policy data identified based on the context data, wherein the policy data indicates a policy corresponding to at least one of the electronic device, a user of the electronic device, the content for presentation, or data associated with the content, wherein the policy indicates one or more context-dependent limitations on presentation of the content by the electronic device;
   before providing the request to the server over the communication network:
      based on the accessed policy data and the received context data, determining, by the one or more network devices, that the policy does not permit at least a portion of the content requested from the server by the request to be displayed by the electronic device in the current context; and
      based on the determination that the policy does not permit at least the portion of the content requested from the server by the request to be displayed by the electronic device in the current context, processing, by the one or more network devices, the request by (i) blocking the request so that the request is not provided to the server or (ii) modifying the request and sending the modified request to the server.

2. The method of claim 1, wherein the electronic device is a television or a computer monitor.

3. The method of claim 1, wherein managing presentation of the content by the electronic device comprises:
   determining, based on the context data, that the policy permits presentation of the content by the electronic device in the context indicated by the context data; and
   in response to determining that the policy permits presentation of the content, causing the electronic device to present the content.

4. The method of claim 1, wherein managing presentation of the content by the electronic device comprises:
   determining, based on the context data, that the policy (i) permits presentation of a first portion of the content by the electronic device in the context, and (ii) disallows presentation of a second portion of the content by the electronic device in the context; and in response to the determination, causing the electronic device to (i) present the first portion of the content and (ii) omit the second portion of the content from presentation.

5. The method of claim 1, wherein the policy is a policy that corresponds to the electronic device, wherein the policy limits actions of the electronic device in different ways for different contexts of the electronic device.

6. The method of claim 1, wherein the policy is a policy that corresponds to the user of the electronic device, wherein the policy specifies different sets of actions that the user is authorized to perform in different contexts.

7. The method of claim 1, wherein the policy is a policy that corresponds to the content for presentation, wherein the policy specifies different actions available to be performed with the content in different contexts.

8. The method of claim 1, wherein the policy is a policy that corresponds to data associated with the content, wherein the policy limits actions that can be performed using individual data elements associated with content in different contexts.

9. The method of claim 1, wherein portions of the content or data elements associated with the content have assigned categories, and wherein the policy indicates different actions that are authorized for different categories given the context.

10. The method of claim 9, wherein the assigned categories include different categories that respectively denote content authorized to be presented in public settings, semi-public settings, and private settings.

11. The method of claim 1, wherein the context data indicates one or more of a location, a time, an event, a number of people near the electronic device, an identity of a person near the electronic device, or another device near the electronic device.

12. The method of claim 1, wherein processing the request comprises blocking the request and notifying the electronic device that the request is denied, without providing the request to the server.

13. The method of claim 1, wherein processing the request comprises:
modifying the request to limit the content requested to content that the policy permits to be displayed by the electronic device in the current context of the electronic device; and
sending the modified request to the server over the communication network.

14. The method of claim 1, comprising maintaining, by the one or more network devices, a local policy cache that stores policy data received from a policy server;
wherein accessing the policy data identified based on the context data comprises accessing the policy data from the local policy cache.

15. The method of claim 1, comprising:
maintaining, by the one or more network devices, a local policy cache that stores policy data received from a policy server; and
distributing, by the one or more network devices, policy data from the local policy cache to one or more client devices over the communication network.

16. The method of claim 1, comprising maintaining, by the one or more network devices, a local policy cache that stores policy data received from a policy server;
wherein accessing the policy data comprises:
determining that the policy is not stored in the local policy cache;

in response to determining that the policy is not stored in the local policy cache, requesting the policy from the policy server; and
updating the local policy cache with the policy received from the policy server.

17. The method of claim 1, wherein receiving the request, receiving the context data, accessing the policy data, determining that the policy does not permit at least the portion of the content requested to be displayed by the electronic device in the current context, and processing the request are performed by a router.

18. The method of claim 1, wherein the one or more network devices implement an authorization gateway configured to selectively route network requests from client devices to one or more cloud-computing server environments, wherein the authorization gateway is configured to selectively route network requests according to policies limiting display of content based on contexts of the client devices.

19. A system comprising:
one or more network devices; and
one or more machine-readable media storing instructions that, when executed by the one or more network devices, cause the one or more network devices to perform operations comprising:
receiving, by the one or more network devices, a request to retrieve content from a server for presentation by an electronic device, wherein the request is received from the electronic device over a communication network;
receiving, by the one or more network devices, context data associated with the request, wherein the context data is provided over the communication network and indicates a current context of the electronic device;
in response to receiving the request and the context data over the communication network, accessing, by the one or more network devices, policy data identified based on the context data, wherein the policy data indicates a policy corresponding to at least one of the electronic device, a user of the electronic device, the content for presentation, or data associated with the content, wherein the policy indicates one or more context-dependent limitations on presentation of the content by the electronic device;
before providing the request to the server over the communication network:
based on the accessed policy data and the received context data, determining, by the one or more network devices, that the policy does not permit at least a portion of the content requested from the server by the request to be displayed by the electronic device in the current context; and
based on the determination that the policy does not permit at least the portion of the content requested from the server by the request to be displayed by the electronic device in the current context, processing, by the one or more network devices, the request by (i) blocking the request so that the request is not provided to the server or (ii) modifying the request and sending the modified request to the server.

20. One or more non-transitory machine-readable media storing instructions that, when executed by one or more network devices, cause the one or more network devices to perform operations comprising:

receiving, by the one or more network devices, a request to retrieve content from a server for presentation by an electronic device, wherein the request is received from the electronic device over a communication network;

receiving, by the one or more network devices, context data associated with the request, wherein the context data is provided over the communication network and indicates a current context of the electronic device;

in response to receiving the request and the context data over the communication network, accessing, by the one or more network devices, policy data identified based on the context data, wherein the policy data indicates a policy corresponding to at least one of the electronic device, a user of the electronic device, the content for presentation, or data associated with the content, wherein the policy indicates one or more context-dependent limitations on presentation of the content by the electronic device;

before providing the request to the server over the communication network:

based on the accessed policy data and the received context data, determining, by the one or more network devices, that the policy does not permit at least a portion of the content requested from the server by the request to be displayed by the electronic device in the current context; and based on the determination that the policy does not permit at least the portion of the content requested from the server by the request to be displayed by the electronic device in the current context, processing, by the one or more network devices, the request by (i) blocking the request so that the request is not provided to the server or (ii) modifying the request and sending the modified request to the server.

\* \* \* \* \*